United States Patent [19]

Frölich et al.

[11] 4,150,019
[45] Apr. 17, 1979

[54] WATER-INSOLUBLE YELLOW TEREPHTHALATE-AZO-ACETOACETYLAMIDO-BENZIMIDAZO-LONE DYESTUFFS

[75] Inventors: Heinrich Frölich, Kelkheim; Joachim Ribka, Offenbach, both of Fed. Rep. of Germany

[73] Assignee: Hoechst Aktiengesellschaft, Frankfurt, Fed. Rep. of Germany

[21] Appl. No.: 396,521

[22] Filed: Sep. 12, 1973

Related U.S. Application Data

[63] Continuation of Ser. No. 127,045, Mar. 22, 1971, abandoned.

[30] Foreign Application Priority Data

Mar. 24, 1970 [DE] Fed. Rep. of Germany ....... 2013984

[51] Int. Cl.$^2$ .................. C09B 29/32; C09B 29/36; D06P 1/04; D21H 1/46
[52] U.S. Cl. .................. 260/157; 548/338; 560/20; 560/22
[58] Field of Search .................................. 260/157

[56] References Cited

U.S. PATENT DOCUMENTS

| | | | |
|---|---|---|---|
| 3,328,384 | 6/1967 | Dietz et al. | 260/157 |
| 3,555,002 | 1/1971 | Ribka et al. | 260/157 |
| 3,555,003 | 1/1971 | Ribka | 260/157 |

*Primary Examiner*—Floyd D. Higel
*Attorney, Agent, or Firm*—Curtis, Morris & Safford

[57] ABSTRACT

Water insoluble yellow monoazo dyestuffs of the general formula 1

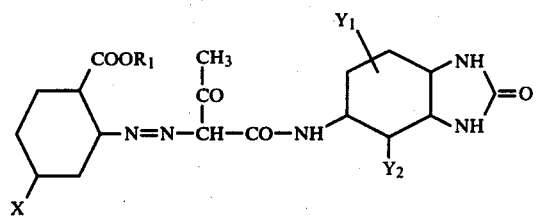

in which $R_1$ represents alkyl, cycloalkyl or aralkyl, X represents a carboxylic acid ester or a carboxylic acid amide, and $Y_1$ and $Y_2$ represent hydrogen, chlorine or bromine, alkyl or alkoxy, and method for their preparation. The dyestuffs are valuable pigments, which may be used for dyeing lacquers, lacquer forming agents, natural or synthetic resins and polymers and for printing textile fibrous materials or paper. They are distinguished by good rheological properties and they are fast to light, weather and migration. Moreover, they are resistant to heat and show color intensity and pure shades.

4 Claims, No Drawings

WATER-INSOLUBLE YELLOW TEREPHTHALATE-AZO-ACETOACETYLAMIDO-BENZIMIDAZOLONE DYESTUFFS

This application is a continuation application of pending application Ser. No. 127,045 filed Mar. 22, 1971, now abandoned.

The present invention relates to new, valuable, water-insoluble yellow monoazo dyestuffs of the general formula 1

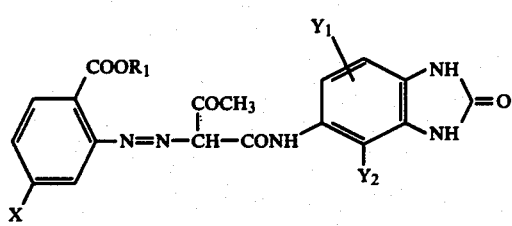

wherein $R_1$ is alkyl of 1 to 6 carbon atoms, cyclohexyl or benzyl;

X is $-COOR_2$ wherein $R_2$ is alkyl of 1 to 6 carbon atoms, cyclohexyl or benzyl, or X is

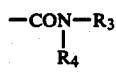

wherein $R_3$ is hydrogen or lower alkyl, $R_4$ is hydrogen, lower alkyl, benzyl, cyclohexyl, phenyl or phenyl substituted by one to three members selected from the group consisting of chlorine, bromine, lower alkyl, lower alkoxy, lower carbalkoxy, acetyl, acetylamino, benzoylamino, trifluoromethyl, phenoxy, sulfamyl and carbamoyl, or $R_3$ and $R_4$ together are piperidine or methylpiperidine; and $Y_1$ and $Y_2$ each is hydrogen, chlorine, bromine, methyl, methoxy or ethoxy, as well as a process for the manufacture of these dyestuffs, which comprises coupling diazotized amines of the general formula 2

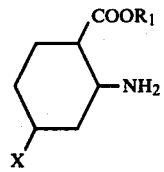

in which $R_1$ and X are as defined above, with coupling components of the general formula 3

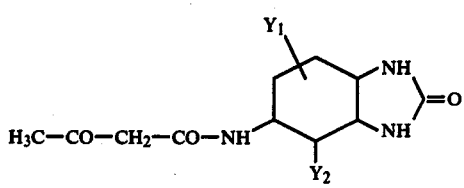

in which $Y_1$ and $Y_2$ are as defined above.

The amines of the general formula 2 used as diazo components can be prepared according to known methods. For example, the amino-terephthalic acid diesters of the general formula 2a, in which $R_1$ and $R_2$ represent equal radicals, can be prepared by reacting nitro-terephthalic acid or nitro-terephthalic dichloride in known manner with alcohols of the general formula $R_1OH$ (4), in which $R_1$ represents alkyl, for example methyl, ethyl, n-butyl, i-propyl, i-butyl, s-butyl, t-butyl, n-hexyl, $\beta$-hydroxy-ethyl, $\beta$-chloro-ethyl, cycloalkyl, for example cyclohexyl or aralkyl, for example benzyl, to form nitro-terephthalic diesters of the general formula 5, in which $R_1$ and $R_2$ represent equal radicals, and by reducing the nitro group to the amino group. Optionally, also terephthalic acid instead of nitro-terephthalic acid can be used as starting material. This acid or its acid chloride can be reacted to form a terephthalic acid diester, and the nitro group can be incorporated by nitration, so that, after reduction of the nitro group, the products of the general formula 2a are obtained also by this method.

The diazo components of the general formula 2b may for example be obtained by partially saponifying nitro-terephthalic diesters of the general formula 5, in which $R_1$ and $R_2$ are equal radicals, to form 3-nitro-benzoic acid-4-carboxylic acid esters of the general formula 6, which, via their acid chloride (7), may be reacted with amines of the general formula 8 to form amides of the general formula 9, which, after reduction of the nitro group, furnish the amino compounds of the general formula 2b.

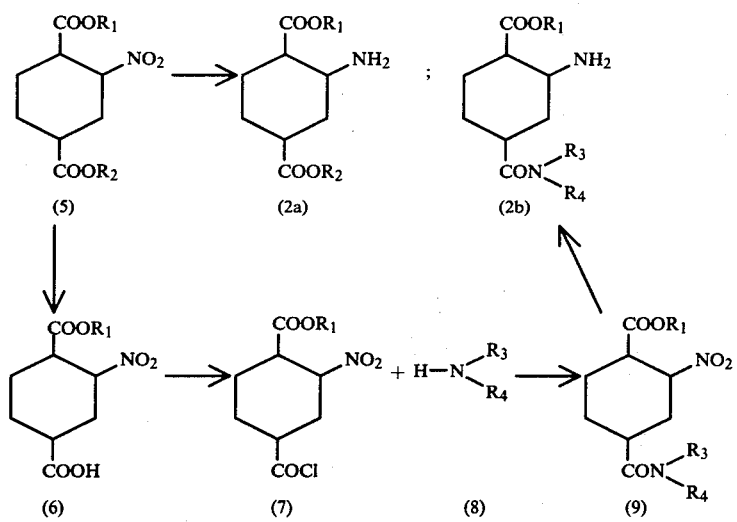

The acid chlorides of the general formula 7 may also be reacted with an alcohol $R_2OH$ instead of the alcohol $R_1OH$, which, after reduction of the nitro group, also results in diesters of the general formula 2a, in which $R_1$ and $R_2$ are different and $R_2$ is chosen from one of the groups indicated under $R_1$.

As amines of the general formula 8, the following compounds may for example be used: ammonia, methylamine, ethylamine, β-hydroxy-ethylamine, n-propylamine, i-propylamine, n-butylamine, i-butylamine, s-butylamine, t-butylamine, n-pentylamine, s-pentylamine, n-hexylamine, allylamine, dimethylamine, diethylamine, di-n-propylamine, di-n-butylamine, cyclohexylamine, benzylamine, piperidine, aniline, mono-, di- and tri-halogeno-anilines, for example 2-chloro-aniline, 3-chloro-aniline, 4-chlorine-aniline, 2,4-dichloro-aniline, 2,5-dichloro-aniline, 2,6-dichloro-aniline, 3,4-dichloroaniline, 2,4,5-trichloro-aniline, 2,4,6-trichloroaniline, 2-bromo-aniline, 4-bromo-aniline, 2,4-dibromoaniline, 2,5-dibromo-aniline; alkyl-anilines, for example 2-methylaniline, 3-methyl-aniline, 4-methyl-aniline, 2,4-dimethylaniline, 2,5-dimethyl-aniline, 4-ethyl-aniline, 4-isopropyl-aniline; alkoxy-anilines, for example 2-methoxy-aniline, 4-methoxy-aniline, 4-ethoxy-aniline, 2-butoxy-aniline, 2,4-dimethoxy-aniline, 2,5-dimethoxy-aniline, 2,5-diethoxy-aniline; halogeno-alkyl-anilines, for example 2-methyl-4-chloro-aniline, 2-methyl-5-chloro-aniline, 2-methyl-3-chloro-aniline, 2-chloro-5-methyl-aniline, 2,4-dichloro-5-ethyl-aniline, 2,5-dichloro-4-methyl-aniline, 2,4,6-trichloro-3-methylaniline, 2-trifluoro-methyl-4-chloro-aniline, 2-chloro-5-trifluoro-methyl-aniline; halogeno-alkoxy-anilines, for example 2-methoxy-5-chloro-aniline, 2-ethoxy-5-chloro-aniline, 2,4-dichloro-5-methoxy-aniline, 4-chloro-2,5-dimethoxy-aniline; acylamino-anilines, for example 4-acetamino-aniline, 2-chloro-4-methyl-5-acetamido-aniline, 2-chloro-5-benzoylamino-aniline; amines acylated in the nucleus, for example 3-amino-4-chloro-aceto-phenone, 3-amino-4-chloro-benzophenone; aminodiphenyl ethers, for example 2-aminodiphenyl ether, 2-amino-2',5'-dichloro-diphenyl ether; aminobenzenecarboxylic acid amides and esters, for example anthranilic acid methyl ester, anthranilic acid butyl ester, 4-chloro-anthranilic acid methyl ester, aminoterephthalic acid dimethyl ester, 4-amino-benzoic acid amide, 3-amino-4-chlorobenzoic acid methylamide, 3-amino-4-methylbenzoic acid amide; aminobenzenesulfonic acid amides, for example 4-aminobenzene-sulfonic acid amide, 2,5-dimethoxy-4-aminobenzene-sulfonic acid methylamide, 2-aminoterephthalic acid methyl ester-(1)-amide-(4); naphthylamine and substituted naphthylamines, for example 1-amino-2-methoxy-naphthalene.

The coupling components of the general formula 3 can be prepared according to known methods, for example by condensation of diketene with 5-amino-benzimidazolone.

As coupling components, the following compounds may for example be used:

5-acetoacetylamino-benzimidazolone
7-chloro-5-acetoacetylamino-benzimidazolone
7-bromo-5-acetoacetylamino-benzimidazolone
6-chloro-5-acetoacetylamino-benzimidazolone
6-bromo-5-acetoacetylamino-benzimidazolone
6-methoxy-5-acetoacetylamino-benzimidazolone
7-methoxy-5-acetoacetylamino-benzimidazolone
6-ethoxy-5-acetoacetylamino-benzimidazolone
7-chloro-4-methyl-5-acetoacetylamino-benzimidazolone
6-methyl-5-acetoacetylamino-benzimidazolone
4,7-dimethyl-5-acetoacetylamino-benzimidazolone and
4-methyl-6-chloro-5-acetoacetylamino-benzimidazolone.

The preparation of dyestuffs of the general formula 1 is carried out according to known methods, for example by combination of diazonium diazonoum compounds with the coupling components in an aqueous medium. It may be advantageous to add surfactants, for example nonionic, anion active or cation active dispersing agents. Diazotation and coupling may also be carried out in the presence of suitable organic solvents, for example glacial acetic acid, alcohols, dioxan, tetrahydrofuran, formamide, dimethylformamide, dimethylsulfoxide or also pyridine.

The dyestuffs so obtained generally do not possess an optimum softness of the grain. Therefore, they are advantageously after-treated in order to obtain their full tinctorial strength and an especially favourable crystalline structure of the pigments. For this purpose, the dried and ground or moist dyestuffs are for example heated for some time in glacial acetic acid, dimethylformamide or other organic solvents, such as pyridine, dimethylsulfoxide, alcohols, chlorobenzene, dichlorobenzene, quinoline, glycol, nitrobenzene, or also in mixtures of such solvents. The temperatures of this process may vary from room temperature to the boiling temperatures of the solvents, or even higher temperatures under pressure. Optionally, the conversion into a form being soft in the grain is possible also by heating with water under pressure; an addition of surfactants or organic solvents, for example of the cited kinds, being of advantage in some cases.

The new dyestuffs are water-insoluble pigments. They are suitable for the preparation of dyed lacquers and lacquer forming agents, solutions and products made from acetyl cellulose as well as cellulose ethers, natural or synthetic resins, such as polymerization or condensation resins, for example amino- or phenoplasts, as well as products made from polystyrene or polyolefins, such as polyethylene or polypropylene, from polyacryl or polyvinyl compounds, such as polyvinyl chloride or polyvinyl acetate, from polyesters, rubber, casein or silicone resins.

The new pigment dyestuffs are furthermore suitable for the pigment print on substrates, especially textile fibrous materials or other flat structures, for example paper. The dyestuffs may also be used for other purposes, for example, in a finely divided form, for the dyeing of viscose-rayon or cellulose esters, polyamides, polyurethanes, polyglycolterephthalates or polyacrylonitriles in the spinning mass, or for the dyeing of paper.

On account of their favourable rheological properties, these dyestuffs can be readily incorporated into the cited media. They show good fastnesses to light, to weather and to migration, they are heat resistant, show colour intensity and, in most cases, pure shades. They are furthermore resistant to the influence of chemicals, especially solvents, acids and alkaline agents.

The following examples illustrate the invention; parts and percentages being by weight unless otherwise stated. The temperatures are indicated in degrees Centigrade.

EXAMPLE 1

34 Parts of 2-aminoterephthalic methyl ester-(1)-(2',5'-dichloro-anilide)-(4) are stirred together with 80 parts by volume of glacial acetic acid and combined with 32 parts by volume of 30% hydrochloric acid, then diazotized at 15° with 20.1 parts by volume of 5 N sodium nitrite solution. The substance is then diluted with 400 parts by volume of water, clarified, and the possible excess of nitrous acid is destroyed by means of amidosulfonic acid. 23.5 Parts of 5-acetoacetylamino-benzimidazolone are dissolved in 250 parts by volume of water and 22,3 parts by volume of 33% sodium hydroxide solution, and clarified with 0.5 part of charcoal. This solution is then added, while stirring thoroughly, to a solution of 30 parts of glacial acetic acid in 300 parts by volume of water. The diazo solution is added dropwise, at 15°–20°, to the precipitate formed, while maintaining the pH at about 4.4 by simultaneously adding dropwise dilute sodium hydroxide solution. After complete coupling, the dyestuff obtained which corresponds to formula 10

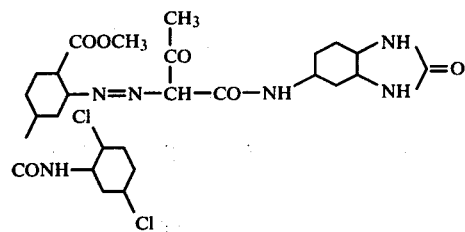

is isolated by suction-filtration and washed.

For the water-treatment, 707 parts of the moist press cake (8.2%) are thoroughly stirred into 2840 parts by volume of glacial acetic acid, heated to and maintained at boiling temperature for 30 minutes. The substance is then cooled to about 80°, the dyestuff is suction-filtered, washed with water, dried and ground.

When 67 parts of polyvinyl chloride, 33 parts of a plasticizer mixture (mixture of equal parts of dioctylphthalate and dibutylphthalate), 0.1 part of the dyestuff obtained and 0.5 part of titanium dioxide are mixed for 15 minutes at 150° on a roll mill and then processed to form a thin film, the yellowish red dyeing of this film is distinguished by its good tinctorial strength and purity, by a good heat and migration resistance and a good fastness to light.

EXAMPLE 2

19.4 Parts of 2-aminoterephthalic acid methyl ester-(1)-amide-(4) are stirred overnight together with 33.2 parts by volume of 37% hydrochloric acid and 48 parts by volume of water, then diluted with 200 parts by volume of water and diazotized at 5°–10° with 20.1 parts by volume of 5 N sodium nitrite solution. Stirring is continued for 1 hour with addition of a slight excess of nitrous acid, the substance is then clarified, and a possibly still existing amount of nitrous acid is destroyed by means of amidosulfonic acid. 23.5 parts of 5-acetoacetylamino-benzimidazolone are dissolved in 250 parts by volume of water and 22.3 parts by volume of 33% sodium hydroxide solution, and clarified with 0.5 part of charcoal. This solution is then added, while stirring thoroughly, to a solution of 30 parts of glacial acetic acid in 300 parts by volume of water. The diazo solution is added dropwise at 15°–20° to the precipitate formed, while adjusting and maintaining a pH of 4.4 by simultaneous addition of dilute sodium hydroxide solution. After having added the diazo solution, coupling is complete. The whole is heated to 70°, the dyestuff of formula 11

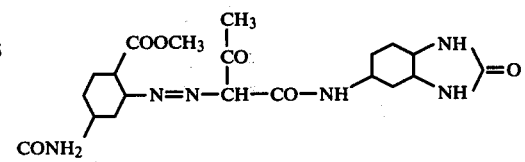

is isolated by suction-filtration, and the product is washed with water.

For the after-treatment, 148.7 parts of the moist press cake (29%) are thoroughly stirred into 827 parts by volume of glacial acetic acid, heated to and maintained at boiling temperature for 1 hour. The substance is then cooled to about 70°, the dyestuff is suction-filtered, washed with water, dried and ground.

The dyestuff so obtained, when incorporated into polyvinyl chloride, a lacquer, a printing ink or a spinning mass, yields yellow dyeings having good fastnesses to heat, light, bleeding and solvents.

EXAMPLE 3

19.4 Parts of 2-aminoterephthalic acid methyl ester-(1)-amide-(4) are diazotized as described in Example 2.

28.05 Parts of 7-chloro-5-acetoacetylamino-benzimidazolone are dissolved in 250 parts by volume of water and 22.3 parts by volume of 33% sodium hydroxide solution, clarified with 0.5 part of charcoal, and this solution is then added, while thoroughly stirring, to a solution of 30 parts of glacial acetic acid and 300 parts by volume of water. Subsequently, the diazo solution is added dropwise, at 15°-20°, to the precipitate formed. After the pH has been adjusted to about 4.4, this value is maintained by simultaneous dropwise addition of dilute sodium hydroxide solution. The substance is heated to 90° C., the temperature is then reduced to about 70° by adding cold water, the dyestuff of formula 12

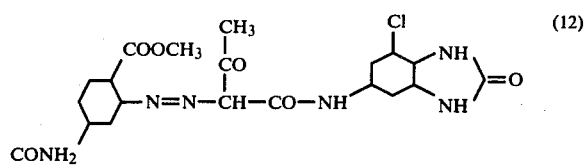

is suction-filtered and washed with water.

For the after-treatment, 281 g of moist press cake (about 16%) are introduced, while stirring, into 1150 parts by volume of glacial acetic acid, heated to boiling temperature and, with thorough mechanical homogenisation, refluxed for 30 minutes. The substance is then allowed to cool to 80°, the dyestuff is suction-filtered, washed with water, dried and ground.

The dyestuff so obtained, when incorporated into polyvinyl chloride, a lacquer, a printing ink or a spinning mass, yields pure yellow dyeings which show good fastnesses to heat, light, bleeding and solvents.

EXAMPLE 4

10.45 Parts of aminoterephthalic acid dimethyl ester are stirred into 16.6 parts by volume of 37% hydrochloric acid and 124 parts by volume of water, and subsequently diazotized at 5°-10° with 10.05 parts by volume of 5 N sodium nitrite solution. Stirring is continued for ½ hour with addition of a slight excess of nitrous acid, the whole is diluted with about 1000 parts by volume of water, and clarified. A possibly existing excess of nitrous acid is then destroyed by means of amidosulfonic acid.

11.8 g of 5-acetoacetylamino-benzimidazolone are dissolved in 125 parts by volume of water and 11.2 parts by volume of 33% sodium hydroxide solution, and clarified with 0.25 part of charcoal. This solution is then added, while stirring thoroughly, to a solution of 15 parts of glacial acetic acid in 150 parts by volume of water. Subsequently, the diazo solution is added dropwise at 15°-20° to the precipitate formed. After a pH of 4.4 has been adjusted, this value is maintained by simultaneous dropwise addition of dilute sodium hydroxide solution. After the diazo solution has been added, coupling is complete. The whole is heated to 90°, the temperature is then reduced to 70° by adding cold water, the dyestuff of formula 13

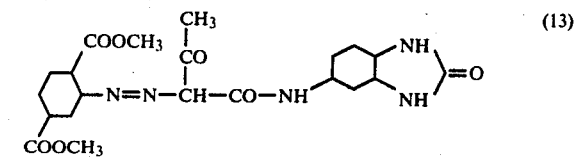

is suction-filtered and washed.

For the after-treatment, 111.4 parts of moist press cake (about 18%) are thoroughly stirred into a mixture of 637 parts by volume of ethyl alcohol and 53.1 parts by volume of glacial acetic acid, heated to boiling temperature and refluxed for 30 minutes with thorough mechanical homogenisation. The dyestuff is then suction-filtered, washed with water, dried and ground to form a fine powder.

When incorporated into polyvinyl chloride, a lacquer, a printing ink or a spinning mass, the dyestuff so obtained yields yellow dyeings of good resistance to heat, migration and solvents, which are distinguished by a very good fastness to light.

EXAMPLE 5

10.45 Parts of aminoterephthalic acid dimethyl ester are diazotized as described in Example 4. The diazonium salt solution obtained is neutralized, at 0°-5°, to a pH of 3.9 by adding about 60 parts by volume of 4 N sodium acetate solution. A clarified solution of 13.4 parts of 7-chloro-5-acetoacetylamino-benzimidazolone in 125 parts by volume of water and 11.2 parts by volume of 33% sodium hydroxide solution is added slowly and dropwise, while stirring, and after the end of this addition, coupling is complete. The substance is heated to 90°, the temperature is then reduced to about 70° by adding cold water, the dyestuff of formula 14

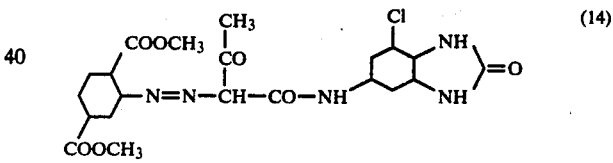

is suction-filtered and washed with water.

For the after-treatment, 121.9 parts of moist press cake are stirred thoroughly into 712 parts by volume of i-propyl alcohol, heated to boiling temperature and refluxed for 30 minutes with thorough mechanical homogenisation. The dyestuff is then suction-filtered, dried and pulverized.

The dyestuff powder so obtained shows a very good fastness to light, such as the dyestuff of Example 4, when used for dyeings of the kind indicated in the same Example 4.

EXAMPLE 6

10.4 Parts of 2-aminoterephthalic acid methyl ester-(1)-methylamide-(4) are stirred into 16.6 parts by volume of 37% hydrochloric acid and 24 parts by volume of water and, after dilution with a further 100 parts by volume of water, diazotized at 5°-10° with 10.05 parts by volume of 5 N sodium nitrite solution. Stirring is continued for 1 hour while adding a slight excess of nitrous acid, the whole is clarified, and a possibly still existing excess of nitrous acid is destroyed by means of amidosulfonic acid.

The diazonium salt solution obtained is coupled in analogy to the method described in Example 2 with 11.7 parts of 5-acetoacetylamino-benzimidazolone. After the coupling is complete, the substance is heated to 90°, then cooled again to 70° by adding cold water, and the dyestuff of formula 15

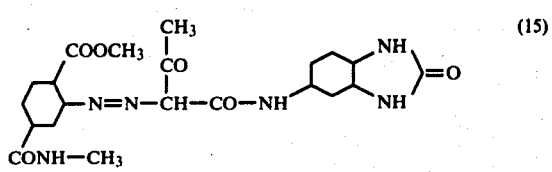

is isolated by suction-filtration and washed.

For the after-treatment, 105.5 parts of moist press cake (about 20.4%) are thoroughly stirred into 583 ml of glacial acetic acid, heated to boiling temperature and refluxed for 30 minutes with thorough mechanical homogenisation. The dyestuff is then allowed to cool to about 80°, suction-filtered, washed with water, dried and pulverized.

When 0.8 part of this pigment, 2.4 parts of aluminum hydroxide and 4.8 parts of a letter-printing varnish are mixed and ground on a three-roll mill, a letter-printing ink of a 10% by weight pigment amount is obtained, which yields yellow prints having high colour intensity and purity as well as a very good fastness to light.

When 0.1 parts of the same dyestuff and 0.5 part of titanium dioxide are incorporated, for 15 minutes and at 150°, in the manner as described in Example 1, into 67 parts of polyvinyl chloride and 33 parts of a plasticizer mixture, a reddish yellow dyeing of the plastics is obtained which is distinguished by very good fastnesses to heat, migration and light as well as by a high colour intensity and purity of the shade.

EXAMPLE 7

20.8 Parts of 2-aminoterephthalic acid ethyl ester-(1)-amide-(4) are diazotized in analogy to the method described in Example 2 and coupled, also as described in Example 2, with 23.5 parts of 5-acetoacetylamino-benzimidazolone. After the coupling is complete, the whole is heated to 70° C. Subsequently, the dyestuff of formula 16

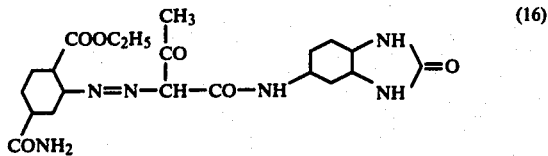

is isolated by suction-filtration and washed.

For the after-treatment, 170 parts of moist press cake (about 24.5%) are thoroughly stirred into a mixture of 403 parts by volume of water and the same amount of dimethylformamide, then heated to and maintained for 30 minutes at a temperature of 50°. Subsequently, the dyestuff is suction-filtered, washed with water, dried and finally ground.

When incorporated into polyvinyl chloride, a lacquer, a printing ink or a spinning mass, the dyestuff so obtained yields yellow dyeings having good fastness to heat, light, bleeding and solvents.

EXAMPLE 8

5.6 Parts of 2-aminoterephthalic acid methyl ester-(1)-dimethylamide-(4) are dissolved in 8.3 parts by volume of 37% hydrochloric acid and 62 parts by volume of water. By adding ice, the whole is cooled to 0° and then diazotized with 5 ml of 5 N sodium nitrite solution. Stirring is continued for 30 minutes with addition of a slight excess of nitrous acid, which excess is then destroyed by means of amidosulfonic acid.

The diazonium salt solution obtained is coupled according to the method described in Example 2 with 6.18 parts of 5-acetoacetylamino-benzimidazolone. After complete coupling, the substance is heated to 90°, which temperature is maintained for 15 minutes, and the product of formula 17

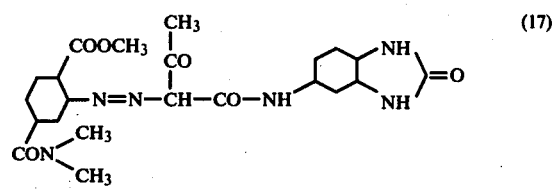

is isolated by suction-filtration, washed with water, dried and ground to form a yellow powder having a good softness of the grain.

EXAMPLE 9

27 Parts of 2-aminoterephthalic acid methyl ester-(1)-anilide-(4) are stirred together with 80 parts by volume of glacial acetic acid and combined with 32 parts by volume of 30% hydrochloric acid. At 15°, the substance is diazotized with 20.1 parts by volume of 5 N sodium nitrite solution. Stirring is continued for 30 minutes with addition of a slight excess of nitrous acid, which excess is then destroyed by means of amidosulfonic acid.

The diazo suspension so obtained is subsequently coupled according to the method described in Example 1 with 23.5 parts of 5-acetoacetylamino-benzimidazolone. After complete coupling, the whole is heated to 90°, which temperature is then reduced to 70° by adding cold water, and finally the dyestuff of formula 18

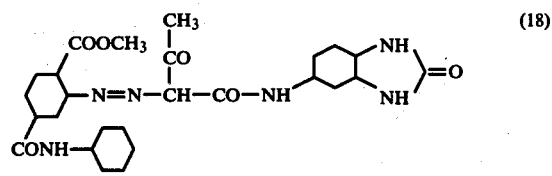

obtained is isolated by suction-filtration and washed.

For the after-treatment, 311.8 g of moist press cake (15.2%) are thoroughly stirred into 1500 parts by volume of ethyl alcohol, heated to boiling temperature and refluxed for 30 minutes, while stirring thoroughly. The dyestuff is then suction-filtered at about 70° C., washed with water, dried and ground.

When 0.8 part of this dyestuff are processed to form a letter-printing ink containing 10 percent of pigment, and subsequently printed, reddish yellow prints of high colour intensity, good purity and very good fastness to light are obtained.

EXAMPLE 10

17 Parts of 2-aminoterephthalic acid methyl ester-(1)-(2',5'-dichloro-anilide)-(4) are diazotized according to the method described in Example 1. The strongly acidic diazo solution obtained is neutralized at 0°–5° to a pH of 3.9 by adding dropwise dilute sodium hydroxide solution. A clarified solution of 13.4 parts of 7-chloro-5-acetoacetylamino-benzimidazolone in 125 parts by volume of water and 11.2 parts by volume of 33% sodium hydroxide solution is added dropwise, while stirring. After this addition, coupling is complete. The substance is heated to 90°, which temperature is then reduced to about 70° by adding cold water, and the dyestuff of formula 19

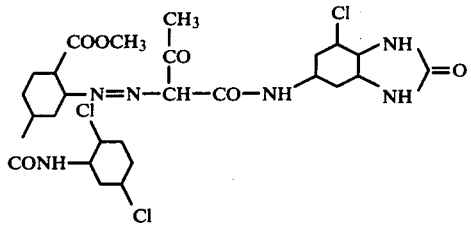
(19)

is suction-filtered and washed.

For the after-treatment, 187.3 parts of moist press cake (16.3%) are thoroughly stirred into 790 parts by volume of glacial acetic acid, heated to boiling temperature and refluxed for 30 minutes with thorough mechanical homogenisation. The substance is then allowed to cool to 80°, the dyestuff is suction-filtered, washed with water, dried and ground.

When incorporated into polyvinyl chloride, a lacquer, a printing ink or a spinning mass, the dyestuff so obtained yields yellow dyeings of good purity, good resistance to heat and migration and very good fastness to light.

Further water-insoluble yellow monoazo dyestuffs having similar pigment properties are listed in the following Table. They can be prepared according to the methods described and to the explanations given in the preceding Examples. They are characterized by the diazo components and coupling components which are used for their preparation.

| Diazo component | Coupling component |
|---|---|
| 2-amino-terephthalic acid methyl ester-(1)-(3',4'-dichloro-anilide)-(4) | 5-acetoacetylamino-benzimidazolone |
| 2-amino-terephthalic acid methyl ester-(1)-(2',3'dichloro-anilide)-(4) | —"— |
| 2-amino-terephthalic acid methyl ester-(1)-(2',4'-dichloro-anilide)-(4) | —"— |
| 2-amino-terephthalic acid ethyl ester-(1)-anilide-(4) | —"— |
| 2-amino-terephthalic acid methyl ester-(1)-(2'-chloro-anilide)-(4) | —"— |
| 2-amino-terephthalic acid methyl ester-(1)-(2'-bromo-anilide)-(4) | —"— |
| 2-amino-terephthalic acid ethyl ester-(1)-(2',5'-dichloro-anilide)-(4) | —"— |
| 2-amino-terephthalic acid methyl ester-(1)-(2,4,5-trichloro-anilide)-(4) | —"— |
| 2-amino-terephthalic acid methyl ester-(1)-(3,4,5-trichloro-anilide)-(4) | —"— |
| 2-amino-terephthalic acid methyl ester-(1)-(2'-methyl-anilide)-(4) | —"— |
| 2-amino-terephthalic acid methyl ester-(1)-(2'-methyl-5'-chloro-anilide)-(4) | —"— |
| 2-amino-terephthalic acid methyl ester-(1)-(2'-chloro-5'-trifluoro-methyl-anilide)-(4) | —"— |
| 2-amino-terephthalic acid methyl ester-(1)-(4'-isopropyl-anilide)-(4) | —"— |
| 2-amino-terephthalic acid methyl ester-(1)-(4'-methoxy-anilide)-(4) | —"— |
| 2-amino-terephthalic acid methyl ester-(1)-(2'-chloro-5'-benzoylamino-anilide)-(4) | —"— |
| 2-amino-terephthalic acid methyl ester-(1)-(2'-phenoxy-anilide)-(4) | —"— |
| 2-amino-terephthalic acid n-propyl ester-(1)-(4'-sulfonamido-anilide)-(4) | —"— |
| 2-amino-terephthalic acid methyl ester-(1)-(2'-chloro-5'-carbonamido-anilide)-(4) | 5-acetoacetylamino-benzimidazolone |
| 2-amino-terephthalic acid n-butyl ester-(1)-anilide-(4) | —"— |
| 2-amino-terephthalic acid n-butyl ester-(1)-amide-(4) | |
| 2-amino-terephthalic acid n-hexyl ester-(1)-amide-(4) | —"— |
| 2-amino-terephthalic acid cyclohexyl ester-(1)-amide-(4) | —"— |
| 2-amino-terephthalic acid benzyl ester-(1)-amide-(4) | —"— |
| 2-amino-terephthalic acid methyl ester-(1)-piperidide-(4) | —"— |
| 2-amino-terephthalic acid n-propyl ester-(1)-methylamide-(4) | —"— |
| 2-amino-terephthalic acid methyl ester-(1)-cyclohexylamide-(4) | —"— |
| 2-amino-terephthalic acid methyl ester-(1)-benzylamide-(4) | —"— |
| 2-amino-terephthalic acid diethyl ester | —"— |
| 2-amino-terephthalic acid di-n-butyl ester | —"— |
| 2-amino-terephthalic acid di-n-propyl ester | —"— |
| 2-amino-terephthalic acid di-iso-butyl ester | —"— |
| 2-amino-terephthalic acid methyl ester-(1)-n-butyl ester-(4) | —"— |
| 2-amino-terephthalic acid di-cyclohexyl ester | —"— |
| 2-amino-terephthalic acid di-benzyl ester | —"— |
| 2-amino-terephthalic acid methyl ester-(1)-anilide-(4) | 7-chloro-5-acetoacetylamino-benzimidazolone |
| 2-amino-terephthalic acid methyl ester-(1)-(2'-chloro-anilide)-(4) | —"— |
| 2-amino-terephthalic acid ethyl ester-(1)-(2'-methyl-anilide)-(4) | 7-chloro-5-acetoacetylamino-benzimidazolone |
| 2-amino-terephthalic acid ethyl ester-(1)-(2'-bromo-anilide)-(4) | —"— |
| 2-amino-terephthalic acid methyl ester-(1)-(2'-methoxy-anilide)-(4) | —"— |
| 2-amino-terephthalic acid methyl ester-(1)-(2'-chloro-4'-methyl-anilide)-(4) | —"— |
| 2-amino-terephthalic acid methyl ester-(1)-(2'-trifluoromethyl-4'-chloro-anilide)-(4) | —"— |
| 2-amino-terephthalic acid methyl ester-(1)-(2'-methoxy-5'-chloro-anilide)-(4) | —"— |
| 2-amino-terephthalic acid methyl ester-(1)-(4'-acetamino-anilide)-(4) | —"— |
| 2-amino-terephthalic acid methyl ester-(1)-(2'-chloro-5'-acetyl-anilide)-(4) | —"— |
| 2-amino-terephthalic acid methyl ester-(1)-(2'-carbomethoxy-anilide)-(4) | —"— |
| 2-amino-terephthalic acid methyl ester-(1)-(2'-phenoxy-anilide)-(4) | —"— |
| 2-amino-terephthalic acid methyl ester-(1)-(2'-chloro-5'-carbonamido-anilide)-(4) | —"— |
| 2-amino-terephthalic acid methyl ester-(1)-(2',4',5'-trichloro-anilide)-(4) | —"— |
| 2-amino-terephthalic acid i-butyl ester-(1)-amide-(4) | —"— |
| 2-amino-terephthalic acid ethyl ester-(1)-amide-(4) | —"— |
| 2-amino-terephthalic acid methyl ester-(1)-methylamide-(4) | —"— |
| 2-amino-terephthalic acid methyl ester-(1)-n-butylamide-(4) | —"— |
| 2-amino-terephthalic acid methyl ester-(1)-cyclohexylamide-(4) | —"— |
| 2-amino-terephthalic acid methyl ester-(1)-benzylamide-(4) | —"— |
| 2-amino-terephthalic acid methyl ester-(1)-diethylamide-(4) | 7-chloro-5-acetoacetylamino-benzimidazolone |
| 2-amino-terephthalic acid methyl ester- | —"— |

-continued

| Diazo component | Coupling component |
|---|---|
| (1)-(2'-methyl-piperidie)-(4) | |
| 2-amino-terephthalic acid diethyl ester | —"— |
| 2-amino-terephthalic acid di-n-butyl ester | —"— |
| 2-amino-terephthalic acid methyl ester-(1)-(2',5'-dichloro-anilide)-(4) | 6-chloro-5-aceto-acetylamino-benzimidazolone |
| 2-amino-terephthalic acid methyl ester-(1)-amide-(4) | —"— |
| 2-amino-terephthalic acid n-butyl ester-(1)-amide-(4) | —"— |
| 2-amino-terephthalic acid methyl ester-(1)-anilide-(4) | —"— |
| 2-amino-terephthalic acid methyl ester-(1)-(2'-chloro-5'-methyl-anilide)-(4) | —"— |
| 2-amino-terephthalic acid methyl ester-(1)-cyclohexylamide-(4) | —"— |
| 2-amino-terephthalic acid dimethyl ester | —"— |
| 2-amino-terephthalic acid methyl ester-(1)-(2',5'-dichloro-anilide)-(4) | 7-bromo-5-aceto-acetylamino-benzimidazolone |
| 2-amino-terephthalic acid methyl ester-(1)-amide-(4) | —"— |
| 2-amino-terephthalic acid methyl ester-(1)-methylamide-(4) | —"— |
| 2-amino-terephthalic acid methyl ester-(1)-(2',4'-dichloro-anilide)-(4) | 7-methoxy-5-aceto-acetylamino-benzimidazolone |
| 2-amino-terephthalic acid ethyl ester-(1)-amide-(4) | —"— |
| 2-amino-terephthalic acid n-butyl ester-(1)-amide-(4) | —"— |

We claim:

1. A dyestuff of the formula

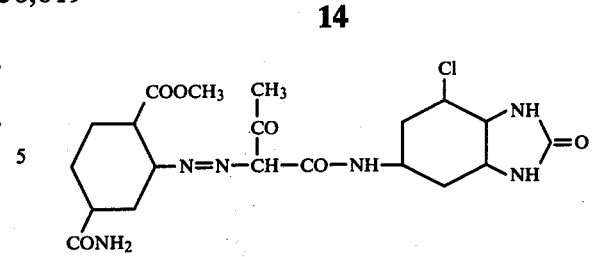

2. A dyestuff of the formula

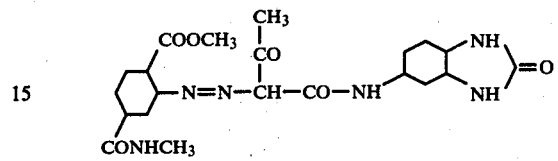

3. A dyestuff of the formula

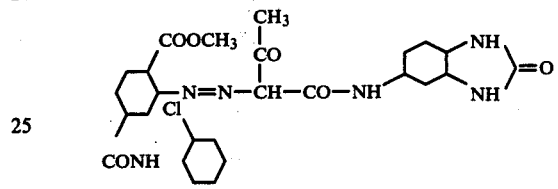

4. A dyestuff of the formula

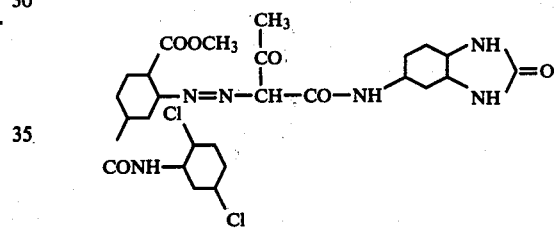

* * * * *